(12) United States Patent
Jacobs et al.

(10) Patent No.: US 9,518,640 B2
(45) Date of Patent: Dec. 13, 2016

(54) DRY VARIABLE SPEED DRIVE MECHANISM

(71) Applicant: Deere & Company, Moline, IL (US)

(72) Inventors: Lourens M. Jacobs, Cedar Falls, IA (US); Thomas M. McConohy, Cedar Falls, IA (US); Allan N. Schott, Reinbeck, IA (US); Nicole M. Gassman, Waterloo, IA (US)

(73) Assignee: DEERE & COMPANY, Moline, IL (US)

( * ) Notice: Subject to any disclaimer, the term of this patent is extended or adjusted under 35 U.S.C. 154(b) by 37 days.

(21) Appl. No.: 14/174,907

(22) Filed: Feb. 7, 2014

(65) Prior Publication Data

US 2015/0226291 A1    Aug. 13, 2015

(51) Int. Cl.
*F16H 55/56* (2006.01)
*F16H 9/08* (2006.01)

(52) U.S. Cl.
CPC ............... *F16H 9/08* (2013.01); *F16H 55/56* (2013.01)

(58) Field of Classification Search
CPC ...... F16H 55/56; F16H 9/18; F16H 61/66272; F16H 63/067; F16H 9/16
USPC .......................................................... 474/8
See application file for complete search history.

(56) References Cited

U.S. PATENT DOCUMENTS

| | | | |
|---|---|---|---|
| 1,350,670 A * | 8/1920 | Ritter | 474/29 |
| 1,952,884 A * | 3/1934 | Nichols et al. | 474/8 |
| 2,013,268 A * | 9/1935 | Douville | 474/39 |
| 2,107,483 A * | 2/1938 | Knight | 474/26 |
| 2,210,300 A * | 8/1940 | Magruder | 15/104.33 |
| 2,253,612 A * | 8/1941 | Dow | 474/8 |
| 2,376,154 A * | 5/1945 | Kershaw | 474/8 |
| 2,769,345 A * | 11/1956 | Bugenhagen | 474/29 |
| 3,200,661 A * | 8/1965 | Chambers | 474/8 |
| 4,313,728 A | 2/1982 | Prasad | |
| 4,378,221 A | 3/1983 | Huff et al. | |
| 4,398,899 A * | 8/1983 | Wood et al. | 474/37 |
| 4,504,022 A * | 3/1985 | Stang et al. | 242/366.1 |
| 5,468,191 A * | 11/1995 | Monahan | 474/8 |

(Continued)

FOREIGN PATENT DOCUMENTS

| | | |
|---|---|---|
| DE | 891344 B | 9/1953 |
| DE | 1284779 A | 12/1968 |

(Continued)

OTHER PUBLICATIONS

Deere & Co, "AM138516-Gator CVT Driven unit", date unknown, 1 page, (image of item in production before the invention of the subject matter of this application).

(Continued)

*Primary Examiner* — Henry Liu

(57) ABSTRACT

A variable drive includes a rotatable drive shaft, a fixed sheave fixed axially relative to the drive shaft and mounted for rotation with the drive shaft, and a movable sheave mounted for axial movement relative to the drive shaft. A plurality of drive fingers project from one of the sheaves. A plurality of recesses are formed in the other sheave. Each drive finger is movably received by a corresponding one of the recesses. A bearing member is interposed between the drive fingers and the other sheave. The bearing member includes a plurality of bearing fingers. Each bearing finger is positioned between one of the drive fingers and a wall of a corresponding one of the recesses.

14 Claims, 6 Drawing Sheets

(56) References Cited

U.S. PATENT DOCUMENTS

| | | | |
|---|---|---|---|
| 6,755,759 B2* | 6/2004 | Blanchard | 474/19 |
| 7,001,293 B2* | 2/2006 | Lubben | 474/8 |
| 7,081,057 B2* | 7/2006 | Kalies | 474/19 |
| 7,165,514 B2 | 1/2007 | Bowman et al. | |
| 7,217,204 B2* | 5/2007 | Roby | 474/14 |
| 7,351,169 B2* | 4/2008 | Jonckheere et al. | 474/29 |
| 7,361,108 B2* | 4/2008 | Haas et al. | 474/35 |
| 2001/0034280 A1* | 10/2001 | Kuga et al. | 474/8 |
| 2002/0155909 A1* | 10/2002 | Roby | 474/14 |
| 2004/0185974 A1 | 9/2004 | Labbe | |
| 2006/0105867 A1* | 5/2006 | Reuschel | 474/18 |
| 2007/0015616 A1* | 1/2007 | Teijido et al. | 474/19 |
| 2007/0155550 A1* | 7/2007 | Faust | 474/8 |
| 2008/0280714 A1* | 11/2008 | Gerlich et al. | 474/153 |
| 2009/0280936 A1* | 11/2009 | Appleton et al. | 474/8 |
| 2011/0092324 A1* | 4/2011 | Roby | 474/8 |

FOREIGN PATENT DOCUMENTS

| | | |
|---|---|---|
| DE | 3140191 A1 | 5/1982 |
| WO | 2013185228 A1 | 12/2013 |

OTHER PUBLICATIONS

German Search Report issued in counterpart application No. 102015201860.1, dated Oct. 13, 2015 (10 pages).

* cited by examiner

DRY VARIABLE SPEED DRIVE MECHANISM

FIELD

The present disclosure relates to a variable speed drive mechanism.

BACKGROUND

Current variable speed fan drives typically include a fixed sheave and a movable sheave which is coupled by splines to a drive shaft. This splined connection must be lubricated with oil or grease. The translational movement of the parts makes it difficult to contain the lubricant with seals. Leaking lubricant causes premature spline wear and lubricant leaking onto the V-belts causing premature belt wear.

U.S. Pat. No. 4,378,221, issued to Huff et al. in March 1983 shows a torque cam assembly for a variable speed belt drive having a fixed sheave and an axially slidable sheave. A collar is mounted on the drive shaft and has a plurality of cams thereon, and a cam follower with generally axially protruding members is mounted on the slidable sheave for cooperating with the cams on the collar. Wear elements on the members contact the cams on the collar. However, in this design the cam and the cam follower are not contained between the sheaves, and a separate collar is required.

SUMMARY

According to an aspect of the present disclosure, a variable speed drive includes a rotatable drive shaft, a fixed sheave, a movable sheave and a bearing member. The fixed sheave is fixed relative to the drive shaft and mounted for rotation with the drive shaft. The fixed sheave has a plurality of spaced apart axially extending drive fingers. The movable sheave is mounted for axial movement relative to the drive shaft, and has a plurality of spaced apart axially extending recesses formed therein. The bearing member includes an annular web which surrounds the drive fingers and a plurality of spaced apart bearing fingers extending axially from then web. Each bearing finger is formed out of a low friction material. Each bearing finger is adjacent to a corresponding one of the drive fingers. Each drive finger and corresponding bearing finger are movably received by a corresponding one of the recesses. Each bearing finger forms a curved bearing surface which slidably engages a surface of a corresponding one of the recesses. Each bearing finger includes a flat surface which engages a corresponding flat surface of the corresponding drive finger.

The result is a more compact assembly where the fingers and recesses are contained between the sheaves, a separate collar is not required and torque is transferred directly from one sheave to the other.

DETAILED DESCRIPTION OF THE DRAWINGS

Figure 1:
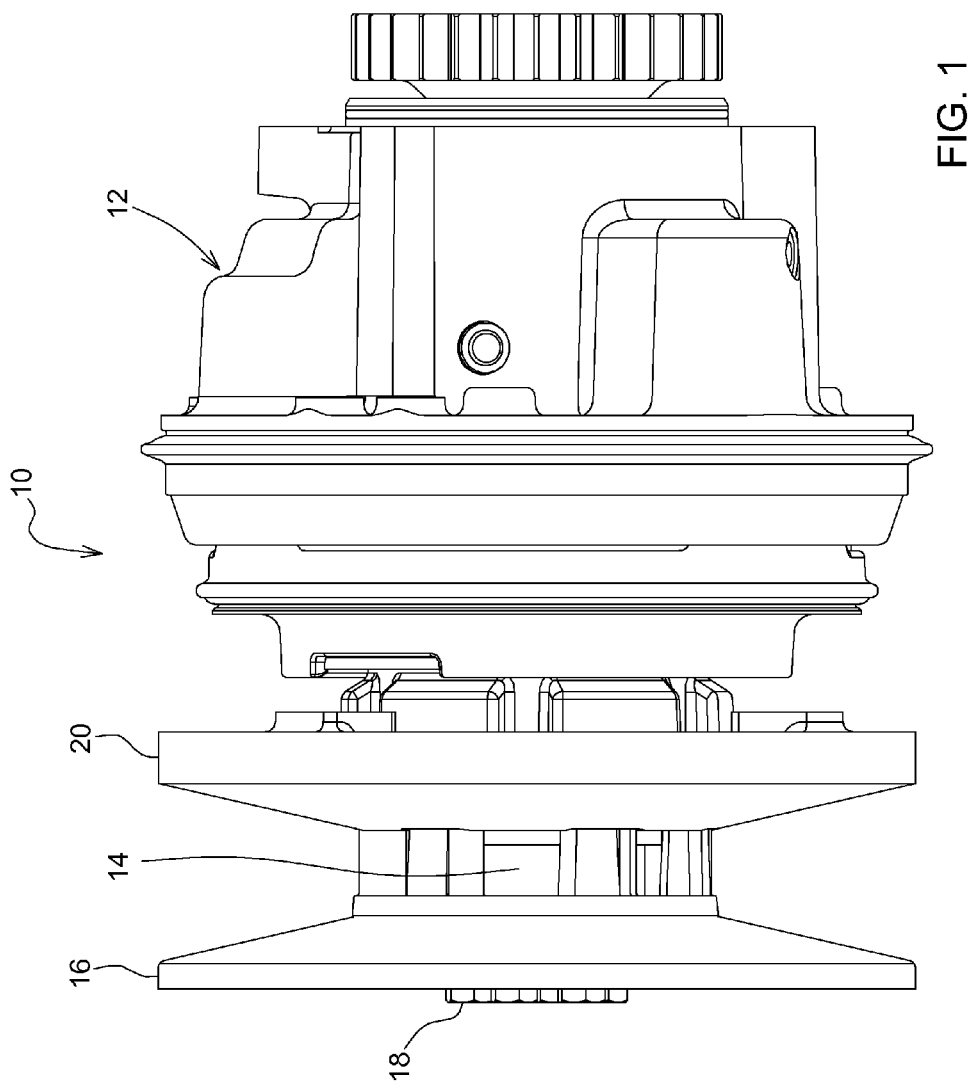
FIG. 1 is side view of a variable speed drive assembly embodying the invention.

Referring to FIGS. 1-4, a variable speed belt drive 10 includes a housing 12 which rotatably supports a drive shaft 14. A fixed sheave 16 is fixed to an end of the drive shaft 14, such as by bolts 18. The fixed sheave 16 is thereby mounted for rotation with the drive shaft 14. A movable sheave 20 is mounted for axial movement relative to the drive shaft 14. The movable sheave 20 rotatably receives the drive shaft 14.

Figure 4:
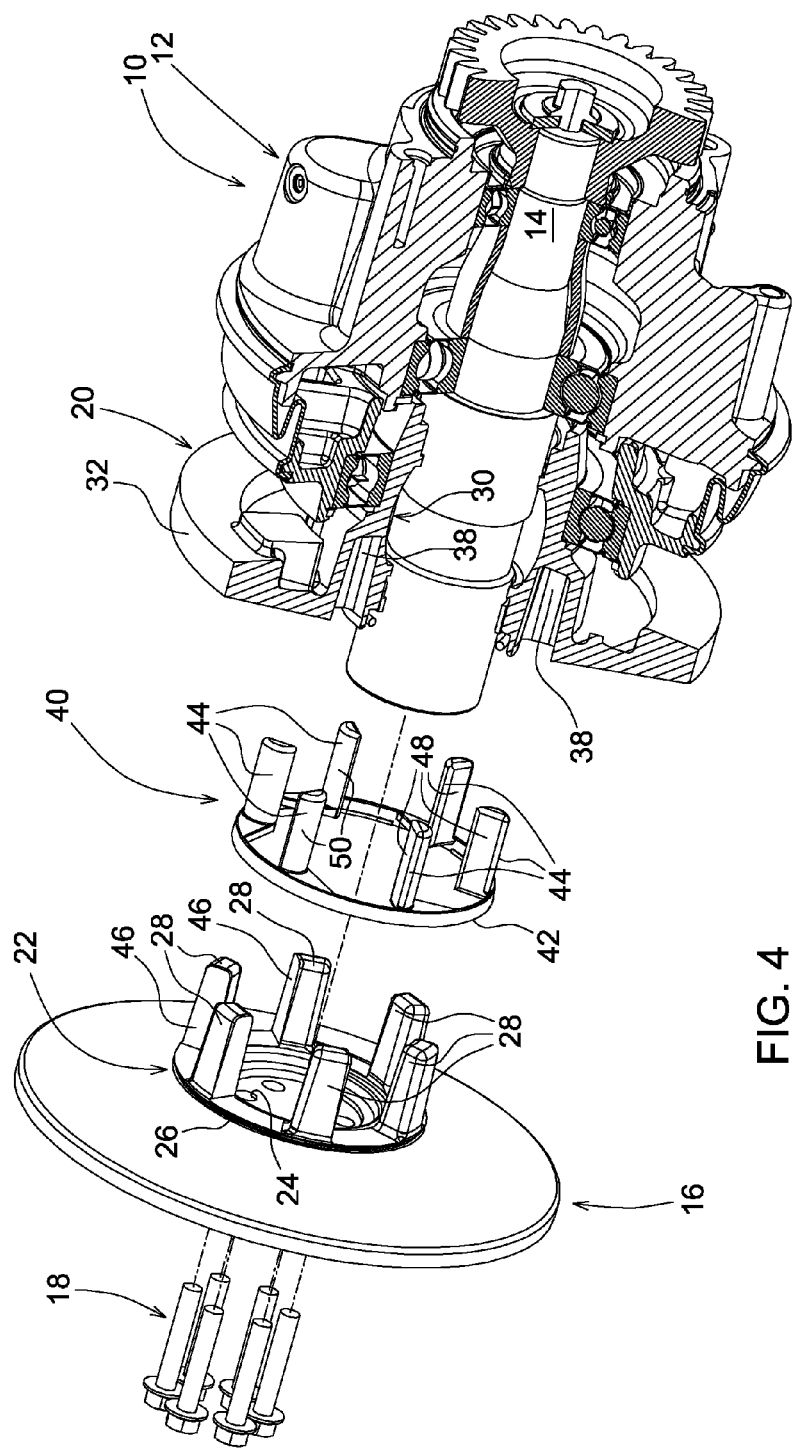
FIG. 4 is an exploded, partially sectioned perspective view of the variable speed drive assembly of FIG. 1.
Figure 7:
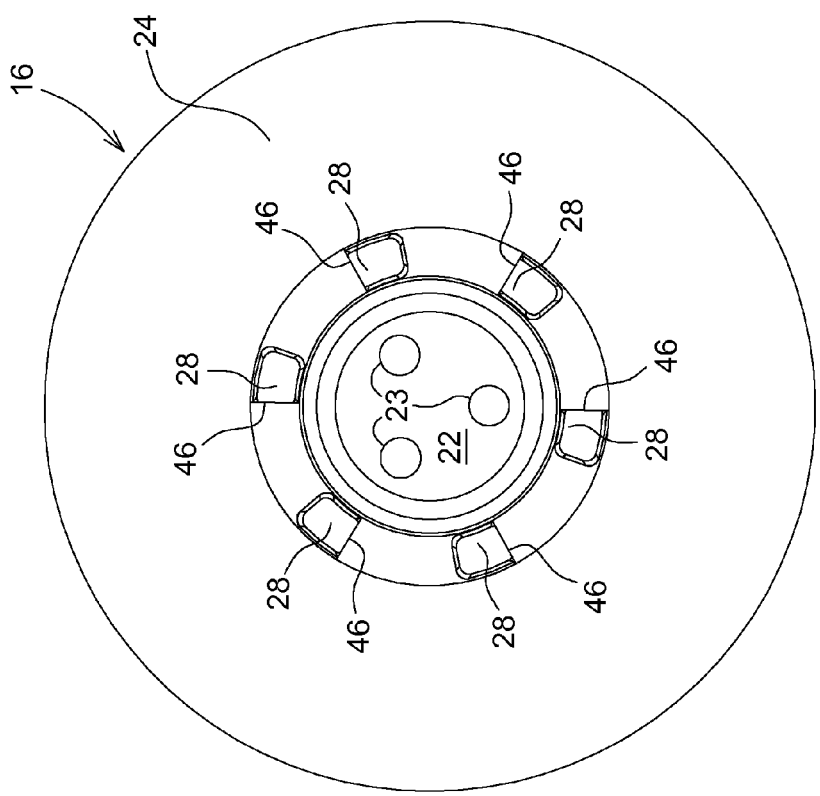
FIG. 7 is an end view of the fixed sheave of FIG. 1.

As best seen in FIGS. 4 and 7, the fixed sheave 16 includes a central hub 22 which has bolt receiving bores 23 extending therethrough and a belt-engaging flange 24 which surrounds the hub 22. The hub 22 includes an outer ring 26. A plurality of, preferably six, spaced apart drive fingers 28 project axially from the ring 26 and towards the movable sheave 20.

Figure 2:
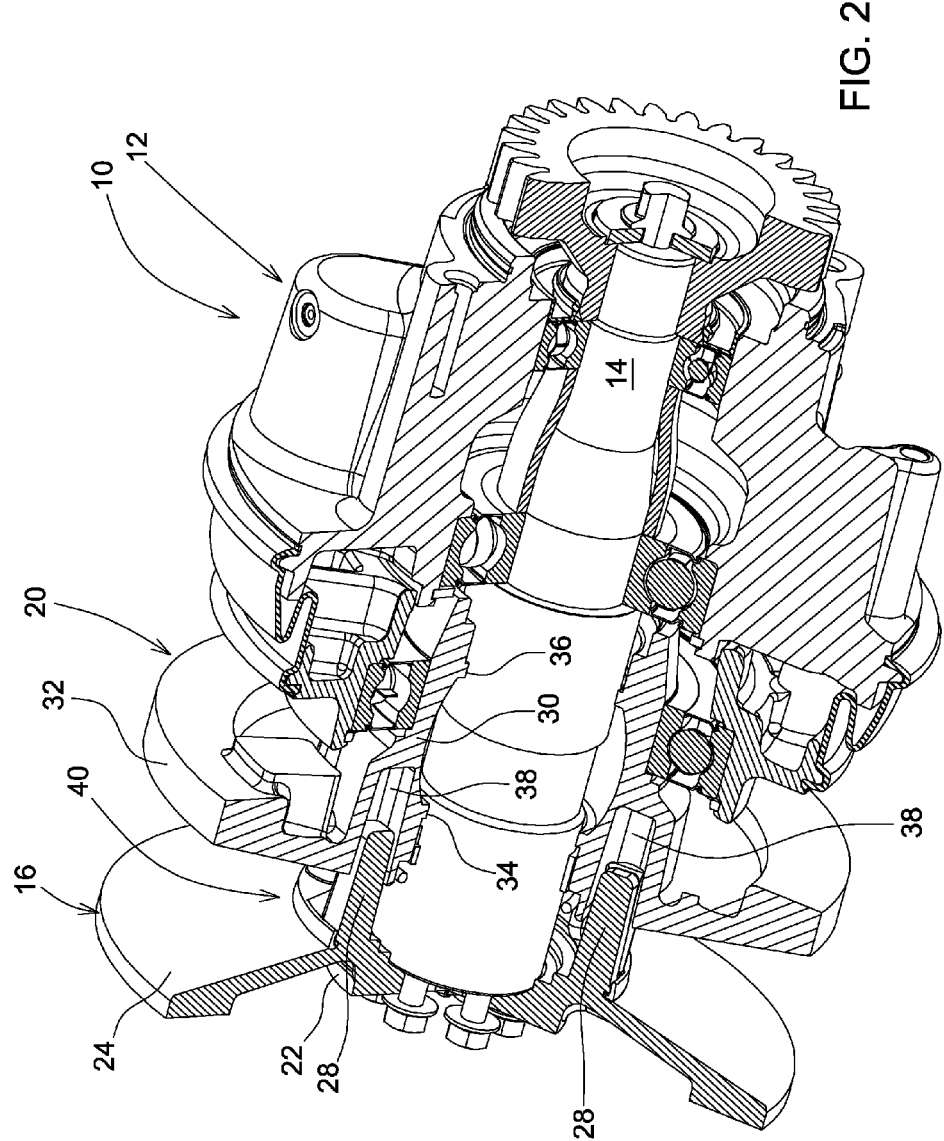
FIG. 2 is a partially sectioned perspective view of the variable speed drive assembly of FIG. 1.
Figure 3:
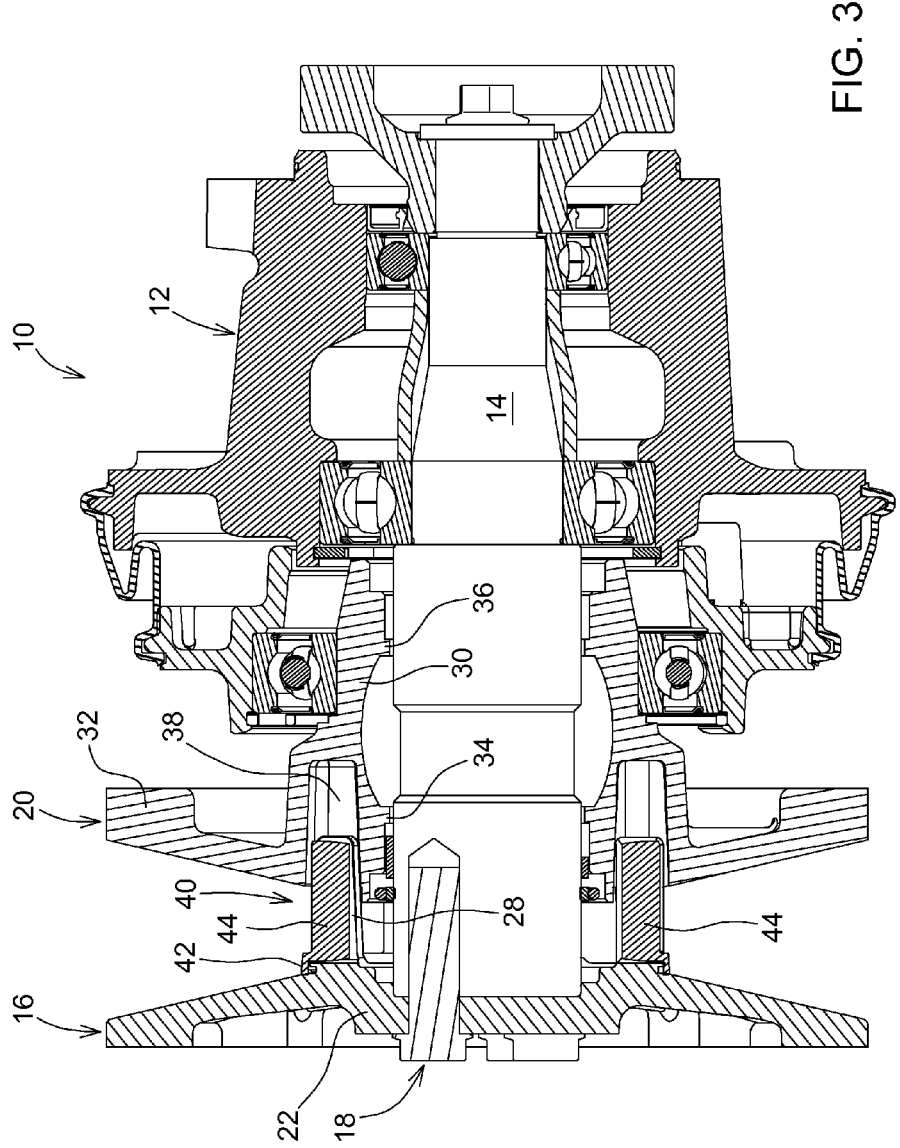
FIG. 3 is a sectional view of the variable speed drive assembly of FIG. 1.

As best seen in FIGS. 2, 3, 5 and 6, the movable sheave 20 includes a hollow axially extending central hub 30 and a belt-engaging flange 32 which surrounds the hub 30. The hub 30 forms a pair of hollow bearing members 34 and 36 which rotatable receive the shaft 14. The hub 30 also includes a plurality, preferably six, of spaced apart recesses 38. The recesses 38 are open in a direction facing the fixed sheave 16, and extend axially into the hub 30 and away from the fixed sheave 26. As best seen in FIGS. 2 and 3, each drive finger 28 and bearing finger 44 is movably received by a corresponding one of the recesses 38. The fixed sheave 16 and the movable sheave 20 are preferably cast parts.

Figure 8:
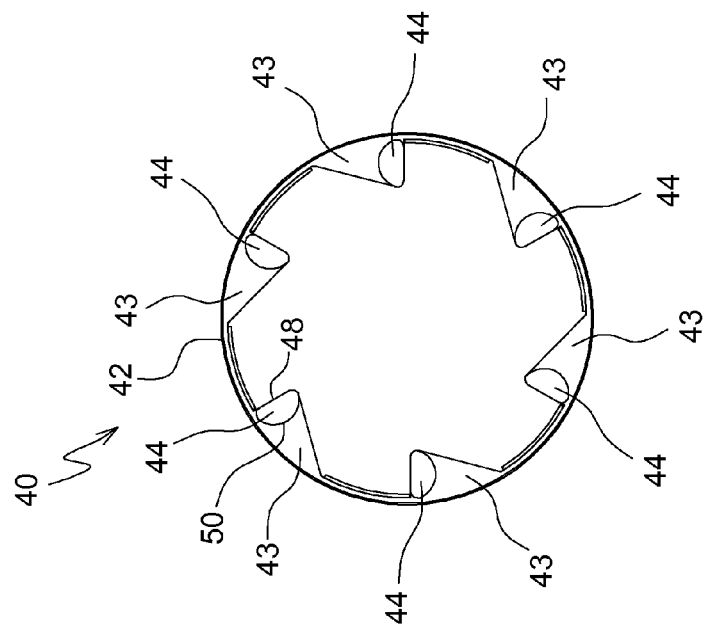
FIG. 8 is an end view of the bearing member of FIG. 3.

As best seen in FIGS. 4 and 8, the assembly 10 also includes a replacable bearing member 40. The bearing member 40 includes an annular ring-shaped base or web 42 and a plurality, preferably six, spaced-apart triangular supports 43 which project inwardly from the web 42. The bearing member 40 also includes a plurality, preferably six, of identical spaced-apart wear pads or bearing fingers 44. Each finger 44 is mounted on a corresponding one of the supports 43. The web 42 surrounds a base portion of the drive fingers 28. Preferably, the entire bearing member 40 is formed as a solid piece of a friction reducing material, such as a plastic sold under the trademark Delrin. Each bearing finger 44 is positioned adjacent a corresponding one of the drive fingers 28. Each drive finger 28 has a radially and axially extending flat side or bearing surface 46 which faces in the direction of rotation of the sheave 16 (counterclockwise viewing FIG. 4).

Each bearing finger 44 has a flat side or surface 48 which faces towards and engages a corresponding one of the flat bearing surfaces 46. Each bearing finger 44 has convex curved side or surface 50 which projects away from the corresponding drive finger 28, and which faces in the counter-clockwise direction viewing FIG. 4. thus, as the movable sheave 20 moves axially towards and away from the fixed sheave 16, each bearing finger 44 slidably engages the inner wall of a corresponding one of the recesses 38, and prevents the corresponding drive finger 28 from slidably engaging the inner wall of the corresponding recess 38. The bearing member 40 eliminates wear between the contact surfaces and thereby eliminating the need for a lubricant.

Figure 6:
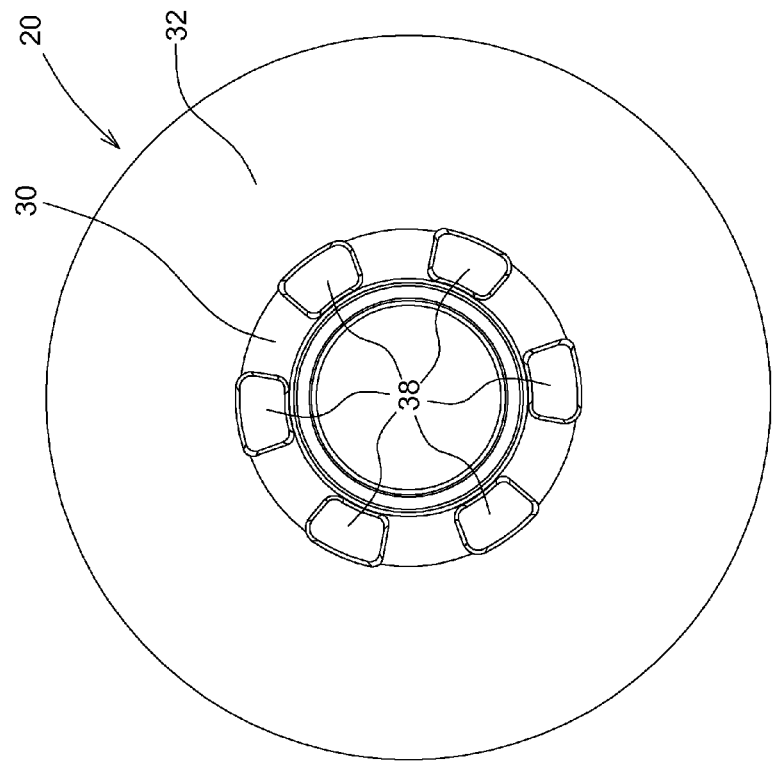
FIG. 6 is an end view of the movable sheave of FIG. 1.
Figure 5:
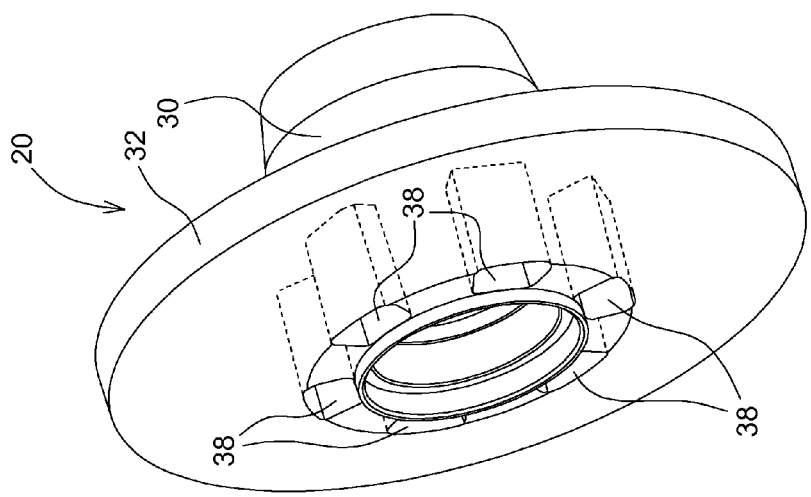
FIG. 5 is a perspective view of the movable sheave of the variable speed drive assembly of FIG. 1.

As best seen in FIG. 6, each recess 38 has an axially extending curved bearing surface 52. Each bearing surface 52 slidably engages the curved bearing surface 50 of the corresponding bearing finger 44.

While the disclosure has been illustrated and described in detail in the drawings and foregoing description, such illustration and description is to be considered as exemplary and not restrictive in character, it being understood that illustrative embodiments have been shown and described and that all changes and modifications that come within the spirit of the disclosure are desired to be protected. It will be noted that alternative embodiments of the present disclosure may not include all of the features described yet still benefit from at least some of the advantages of such features. Those of ordinary skill in the art may readily devise their own implementations that incorporate one or more of the features of the present disclosure and fall within the spirit and scope of the present invention as defined by the appended claims.

What is claimed is:

1. A variable speed drive comprising:
a rotatable drive shaft;
a fixed sheave fixed relative to the drive shaft and mounted for rotation with the drive shaft;
a movable sheave mounted for axial movement relative to the drive shaft;
a plurality of drive fingers projecting axially from one of either the fixed sheave or the movable sheave;
a bearing member comprising a plurality of axially extending bearing fingers, each bearing finger being adjacent a corresponding one of the drive fingers; and
a plurality of recesses in the other of either the fixed sheave or the movable sheave, each drive finger and corresponding bearing finger being movably received by a corresponding one of the recesses, and each bearing finger forming a bearing surface which slidably engages a surface of a corresponding one of the recesses.

2. The variable drive assembly of claim 1, wherein:
the bearing member comprises an annular web which surrounds the drive fingers.

3. The variable drive assembly of claim 2, wherein:
the bearing fingers project from the web.

4. The variable drive assembly of claim 1, wherein:
the bearing fingers comprise a low friction material.

5. The variable drive assembly of claim 1, wherein:
the bearing fingers are formed out of a Delrin plastic.

6. The variable drive assembly of claim 1, wherein:
each bearing finger includes a flat surface which engages a corresponding flat surface of the corresponding drive finger.

7. The variable drive assembly of claim 6, wherein:
each bearing finger includes a curved surface which engages a corresponding surface of the corresponding recess.

8. A variable drive comprising:
a rotatable drive shaft;
a fixed sheave fixed axially relative to the drive shaft and mounted for rotation with the drive shaft;
a movable sheave mounted for axial movement relative to the drive shaft;
a plurality of drive fingers projecting from one of either the fixed sheave or the movable sheave;
a plurality of recesses in the other sheave, each drive finger being movably received by a corresponding one of the recesses; and
a bearing member which is interposed between the drive fingers and the other of either the fixed sheave or the movable sheave.

9. The variable drive assembly of claim 8, wherein:
the bearing member comprises a plurality of bearing fingers, each bearing finger being positioned between one of the drive fingers and a wall of a corresponding one of the recesses.

10. The variable drive assembly of claim 9, wherein:
the bearing fingers and the drive fingers project axially away from the fixed sheave.

11. The variable drive assembly of claim 9, wherein:
the bearing fingers slidably engage the movable sheave.

12. The variable drive assembly of claim 8, wherein:
each bearing finger includes a flat surface which engages a corresponding flat surface of the corresponding drive finger.

13. The variable drive assembly of claim 12, wherein:
each bearing finger includes a curved surface which engages a corresponding surface of the corresponding recess.

14. A variable speed drive comprising:
a rotatable drive shaft;
a fixed sheave fixed relative to the drive shaft and mounted for rotation with the drive shaft, the fixed sheave having a plurality of spaced apart axially extending drive fingers;
a movable sheave mounted for axial movement relative to the drive shaft, the movable sheave having a plurality of spaced apart axially extending recesses formed therein; and
a bearing member comprising an annular web which surrounds the drive fingers and a plurality of spaced apart bearing fingers extending axially from the web, each bearing finger being formed out of a low friction material, each bearing finger being adjacent to a corresponding one of the drive fingers, and each drive finger and corresponding bearing finger being movably received by a corresponding one of the recesses, and each bearing finger forming a curved bearing surface which slidably engages a surface of a corresponding one of the recesses, and each bearing finger including a flat surface which engages a corresponding flat surface of the corresponding drive finger.

* * * * *